United States Patent
Davis et al.

(10) Patent No.: US 9,446,727 B2
(45) Date of Patent: Sep. 20, 2016

(54) FLEXIBLE INTERIOR MOUNT FASCIA BRACKET

(71) Applicant: Maclean-Fogg Company, Mundelein, IL (US)

(72) Inventors: David J. Davis, Rochester, MI (US); Jeffrey M. DeMuth, Roscoe, IL (US)

(73) Assignee: MACLEAN-FOGG COMPANY, Mundelein (IL)

( * ) Notice: Subject to any disclaimer, the term of this patent is extended or adjusted under 35 U.S.C. 154(b) by 0 days.

(21) Appl. No.: 14/694,111

(22) Filed: Apr. 23, 2015

(65) Prior Publication Data

US 2015/0307047 A1 Oct. 29, 2015

Related U.S. Application Data

(60) Provisional application No. 61/984,202, filed on Apr. 25, 2014.

(51) Int. Cl.
*B60R 19/24* (2006.01)
*B60R 19/48* (2006.01)
*B60R 21/013* (2006.01)
*B62D 25/08* (2006.01)

(52) U.S. Cl.
CPC ........... *B60R 19/483* (2013.01); *B60R 21/013* (2013.01); *B62D 25/08* (2013.01)

(58) Field of Classification Search
CPC ... B60R 19/24; B60R 19/483; B60R 21/013; B62D 25/08
USPC ........................................ 293/155, 102, 103
See application file for complete search history.

(56) References Cited

U.S. PATENT DOCUMENTS

| | | | | |
|---|---|---|---|---|
| 5,226,695 A * | 7/1993 | Flint | ...................... | B60R 19/24 293/121 |
| 5,580,109 A * | 12/1996 | Birka | ...................... | B60R 19/18 293/120 |
| 6,354,641 B1 * | 3/2002 | Schroeder | ............... | B60R 19/18 293/122 |
| 6,435,579 B1 * | 8/2002 | Glance | .................... | B60R 19/18 293/102 |
| 6,886,872 B2 * | 5/2005 | Matsumoto | ............. | B60R 19/12 293/115 |

FOREIGN PATENT DOCUMENTS

| | | |
|---|---|---|
| DE | 19924505 A1 | 11/2000 |
| EP | 2 407 802 A1 | 1/2012 |
| EP | 2546615 A2 | 1/2013 |
| EP | 2 650 694 A1 | 10/2013 |
| JP | 2012242353 A | 12/2012 |

OTHER PUBLICATIONS

Extended European Search Report issued Sep. 23, 2015 in European Application No. 15 165 090.0, 7 pages.

* cited by examiner

*Primary Examiner* — Joseph D Pape
(74) *Attorney, Agent, or Firm* — Brinks Gilson & Lione (57) ABSTRACT

A bracket is provided that may be welded to the interior surface of a vehicle fascia. The bracket has a flange and a mounting boss. The flange is slotted to form flexible fingers that conform to the interior surface of the fascia. The fingers are welded to the fascia to attach the bracket to the interior surface of the fascia. A vehicle component, such as an impact sensor, is attached to the mounting boss to secure it to the fascia.

20 Claims, 9 Drawing Sheets

FLEXIBLE INTERIOR MOUNT FASCIA BRACKET

RELATED APPLICATIONS

The present patent document claims the benefit of the filing date under 35 U.S.C. §119(e) of Provisional U.S. Patent Application Ser. No. 61/984,202, filed Apr. 25, 2014, which is hereby incorporated by reference.

BACKGROUND

The present invention relates generally to vehicle fascias and a bracket welded to the interior surface of a vehicle fascia.

Figure 1:
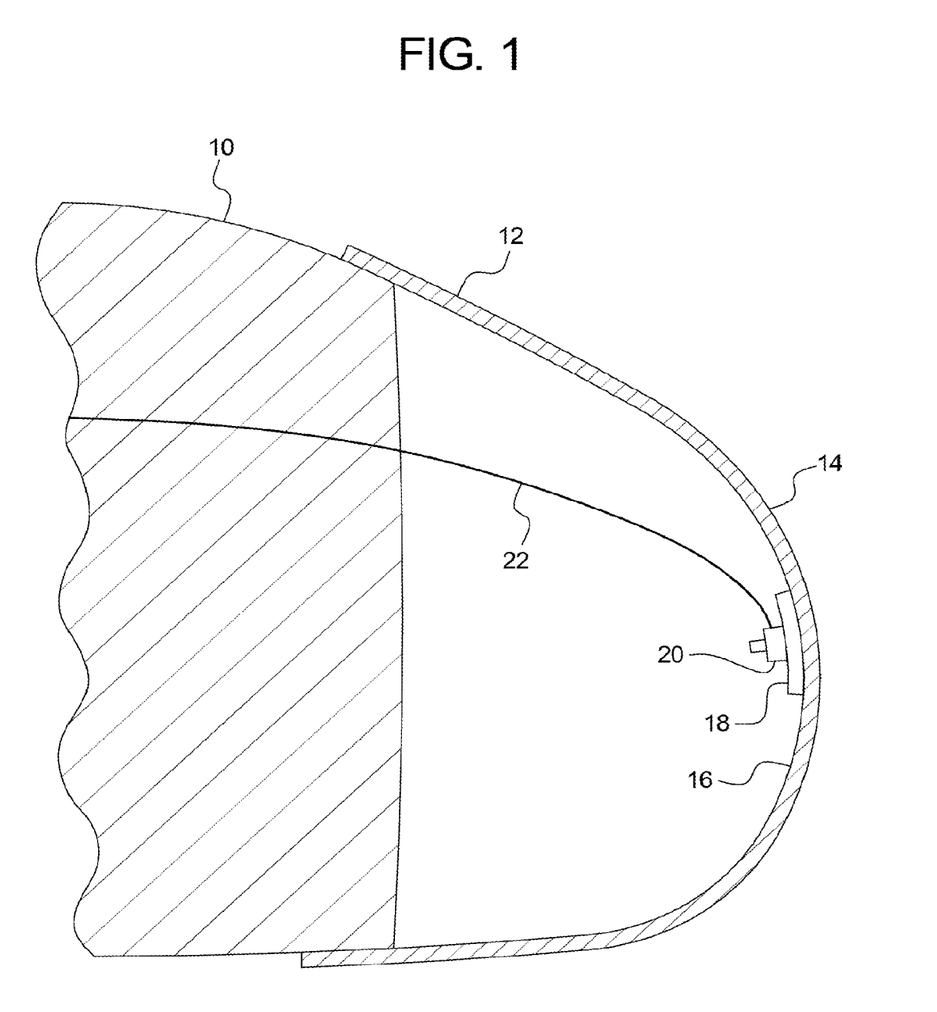
FIG. 1 is a side cross-sectional view of a vehicle bumper and fascia, showing a bracket attached to the interior surface of the fascia.

In general, vehicle fascias are aesthetic components that vehicle manufacturers use to cover certain functional areas of a vehicle. As shown in FIG. 1, one area where a vehicle fascia may be used is on a vehicle bumper. In the particular example of FIG. 1, the fascia is attached to the front bumper of an automobile. Fascias may also be used on the rear bumper of a vehicle and elsewhere as well. Although a fascia may be considered primarily to be an aesthetic component, various functional components may also be attached to a fascia. For example, in the case of an automobile front bumper, a license plate may be attached to the exterior surface of the fascia, and headlights may be mounted on the fascia.

It may also be desirable to attach various types of brackets to the interior surface of a vehicle fascia. For example in FIG. 1, an impact sensor is shown welded to the interior surface of a front bumper fascia. The impact sensor may be an accelerometer or other type of sensor designed to monitor the front bumper fascia for impact forces that may occur, for example, when the vehicle impacts a pedestrian. And electrical wire connects the impact sensor to a control system in the vehicle in order to transmit impact data to the control system. In the event of an impact with a pedestrian, the control system may activate a pedestrian protection system. For example, the hood of the vehicle may be raised in response to impact data from the sensor. The raised hood is designed to catch the pedestrian's body and may thereafter be designed to drop back down to absorb the energy of the impact in a controlled manner that minimizes injury to the pedestrian.

However, attaching brackets to the interior surface of a vehicle fascia can be difficult and costly. A fascia is generally a plastic component that is molded with a generally constant thin-wall thickness. Although the thickness of a fascia may vary to a certain degree, a plastic material with a thin-wall thickness is generally desired since the fascia is primarily an aesthetic component, and thus, structural strength is not a primary concern. Also, it is desirable to minimize the cost of the fascia. However, because the exterior surface of the fascia is primarily an aesthetic surface, the exterior surface must remain smooth and unblemished. A uniform wall thickness is generally helpful in maintaining the desired smooth, unblemished exterior surface during manufacturing, since the fascia is typically made by a molding process and significant wall thickness changes could make it difficult to reliably mold a smooth exterior aesthetic surface.

As shown in FIG. 1, vehicle fascias are typically curved structures that are molded in an aesthetic shape that is desirable for the particular vehicle it is designed for. Although not illustrated in FIG. 1, a fascia typically has a three-dimensional shape with the curvature of the fascia extending in multiple directions. While the exterior and interior surfaces of all fascias typically have some amount of curvature at least in certain areas, front bumper fascias typically have more curvature in their shape compared to other fascias since the front bumper defines the leading surface of a vehicle, and an aerodynamic exterior surface is usually desired.

Because the interior surface of a vehicle fascia is usually curved, brackets that are attached to the interior surface of a fascia are normally curved to match the curvature of the interior surface of the fascia. A conventional bracket with a matching curved shape may then be welded to the interior surface of a fascia, and various functional components, such as an impact sensor, may be attached to the bracket. However, conventional brackets designed with a matching curvature present a number of problems that the invention described below may overcome. For example, because most vehicle models are designed with different exterior aesthetics, each vehicle model is typically designed with special fascias designed only for that particular vehicle. Thus, each vehicle model typically has its own fascias that are different from all other fascias used on other vehicle models. Thus, in the vehicle industry as a whole, there are many different styles of fascias that are used. As a result, a conventional bracket with a matching curved shape can only be used for the specific fascia it was designed for, and different brackets must be designed for each vehicle model.

In addition, for some brackets an individual vehicle may require multiple sensors and brackets attached to a single fascia. For example, when a vehicle is provided with a pedestrian protection system, the front bumper fascia is typically provided with three to five impact sensors like in FIG. 1 along the length of the fascia. This allows the protection system to monitor impacts at multiple points on the front bumper fascia. However, because a front bumper fascia is typically defined by a complex three-dimensional curved shape, it is not uncommon for each sensor on a single fascia to require a unique curved bracket that is specially shaped for that particular spot where each bracket will be attached to the fascia.

Another problem with conventional brackets with matching curved shapes is that they must be precisely positioned in the exact spot on the fascia that the bracket is designed for. Depending on the shape of the particular fascia involved, correct positioning may require a high degree of precision both in positioning the bracket in the X and Y directions but also rotationally. That is, because the fascia and the matching bracket are designed with a unique, matching shape, a complete match in the curved shapes of the fascia and the bracket may only occur at a specific point where the bracket was designed to be attached. Also, because the curvatures involved may be three-dimensional and different around the periphery of the bracket, precise rotational alignment may also be required.

If a conventional bracket with a matching curved shape is mispositioned or misrotated on the fascia when it is welded to the fascia, the bracket may deform the fascia when it is welded to the interior surface of the fascia. That is, if the curved shapes of the fascia and the bracket do not match due to mispositioning or misrotation of the bracket, the mismatched curved shapes will be squeezed together during welding of the bracket to the fascia. Because the fascia is typically a thin-walled plastic component that is readily deformable, such a mismatch between the bracket and the interior surface of the fascia may cause the fascia wall to deform, and the deformation may be visible on the exterior surface of the fascia. This is undesirable because, as noted, the exterior surface of the fascia is an aesthetic surface that is preferably smooth and unblemished.

Accordingly, the inventors believe that an improved bracket for mounting to the interior surface of a vehicle fascia would be desirable.

SUMMARY

A bracket is described that may be mounted to the interior surface of a vehicle fascia. The bracket has a flange that surrounds the periphery of the bracket. Inside of the flange is a mounting boss that may be used to attach various vehicle components to the bracket. Slots extend through the flange to form flexible fingers. The fingers conform to the interior surface of the fascia when the bracket is pressed against the interior surface of the fascia. The inventions herein may also include any other aspect described below in the written description, the claims, or in the attached drawings and any combination thereof.

BRIEF DESCRIPTION OF SEVERAL VIEWS OF THE DRAWINGS

The invention may be more fully understood by reading the following description in conjunction with the drawings, in which.

DETAILED DESCRIPTION

Referring now to the figures, and particularly to FIG. 1, a front bumper 10 and fascia 12 for an automotive vehicle are shown. The fascia 12 will typically have a generally uniform thickness of about 2.5 mm to 3.2 mm. The material of fascia 12 is typically a plastic material, and preferably, thermoplastic olefin. The fascia 12 usually has a complex three-dimensional shape that is formed by molding. The fascia 12 may be attached to the front bumper 10 with screws or other common fasteners and is designed to provide an aesthetic cover for the bumper 10. The fascia 12 has an exterior surface 14 that is designed to be an aesthetic surface 14 that is visible from outside the vehicle. Thus, the exterior surface 14 of the fascia 12 is typically aesthetically painted and is required to have a visually appealing, unblemished surface. The fascia 12 also has an interior surface 16 that is generally enclosed within the space between the bumper 10 and the fascia 12. The interior surface 16 is generally not visible when the vehicle is used, and thus, the interior surface 16 may not be painted if desired. As shown, the interior surface 16 of the fascia 12 typically has a generally concave shape, and the exterior surface 14 has a corresponding generally convex shape.

A bracket 18 described in more detail below is attached to the interior surface 16 of the fascia 12. Preferably, the bracket 18 is made from a plastic material that is compatible with the fascia 12 to allow the bracket 18 to be welded to the fascia 12. The bracket 18 is preferably a molded part which could be made from thermoplastic olefin. A critical feature of the bracket 18 is that deformation of the fascia 12 must be minimized when the bracket 18 is welded to the fascia 12. Thus, the attachment of the bracket 18 to the interior surface 16 of the fascia 12 should be visibly undetectable from the exterior surface 14 of the fascia 12. Although the inventive bracket 18 may be particularly applicable to front bumper fascias 12 due to the high degree of curvature in the shape of typical front bumper fascias 12, the bracket 18 may also be used on the interior surface 16 of other vehicle fascias 12 as well. In the particular embodiment shown and described herein, the bracket 18 may be used to attach an impact sensor 20 onto the interior surface 16 of the front bumper fascia 12. A wire 22 electrically connects the impact sensor 20 to a control system of a pedestrian protection system. When the control system senses that an impact against the front bumper fascia 12 has occurred due to a signal transmitted from the impact sensor 20 through the wire 22, the control system activates various pedestrian protection responses, such as raising and lowering the hood of the vehicle in order to minimize injury to the pedestrian. Although the bracket 18 may be particularly applicable to a bracket 18 for an impact sensor 20 in a pedestrian protection system, the bracket 18 may also be used to attach various other functional components to the interior surface 16 of a fascia 12.

Figure 2:
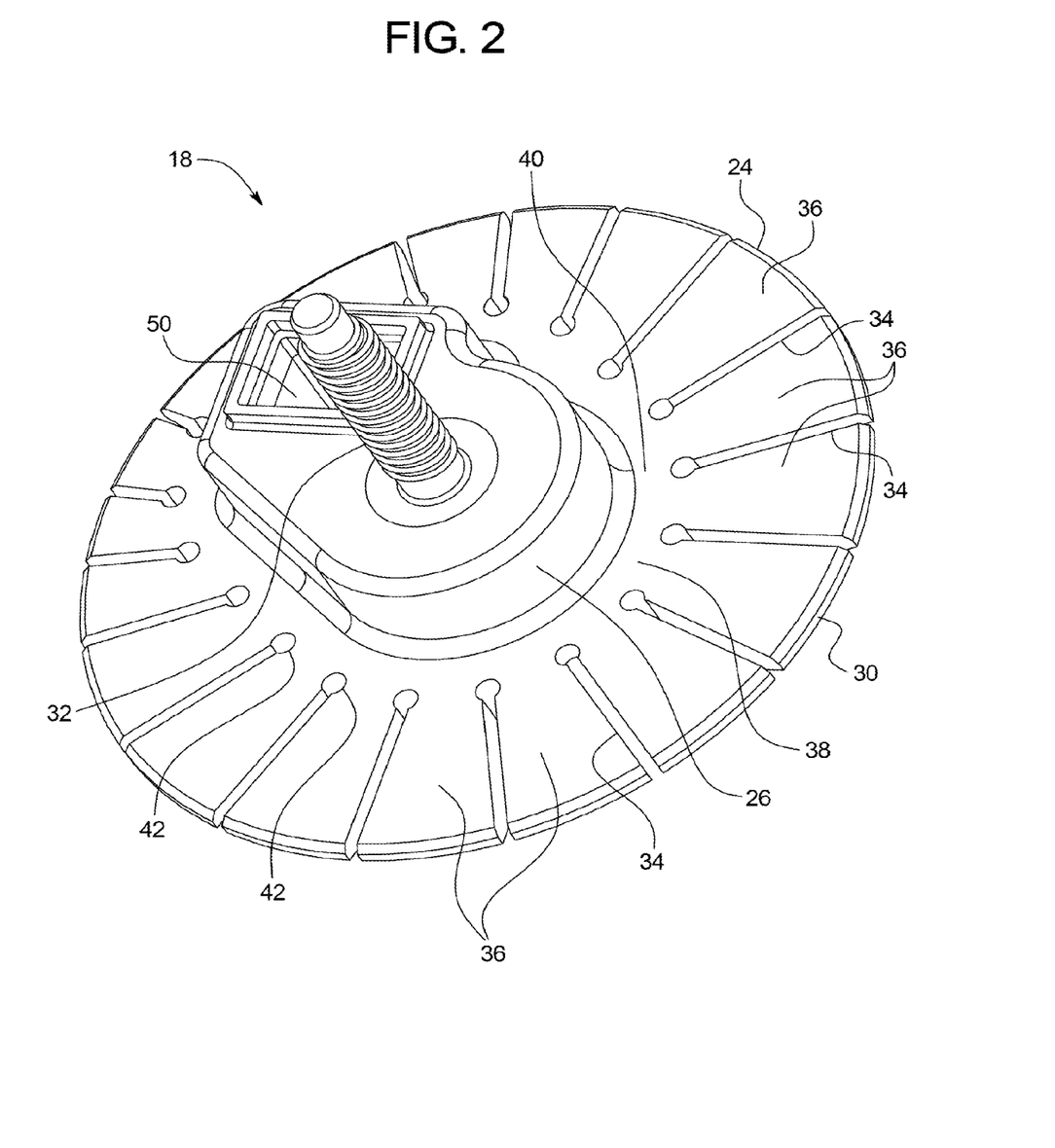
FIG. 2 is a perspective view of the bracket.
Figure 3:
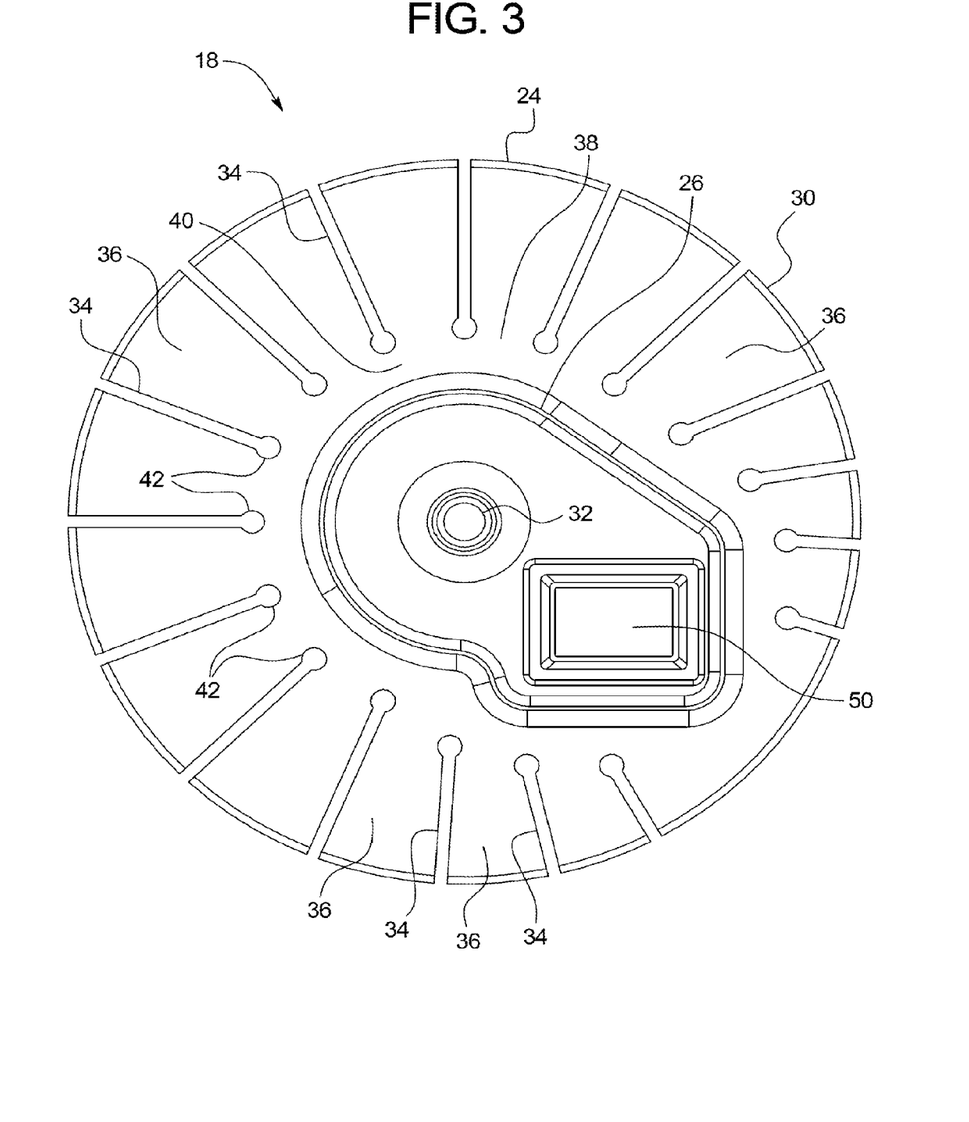
FIG. 3 is a top elevational view of the bracket.
Figure 4:
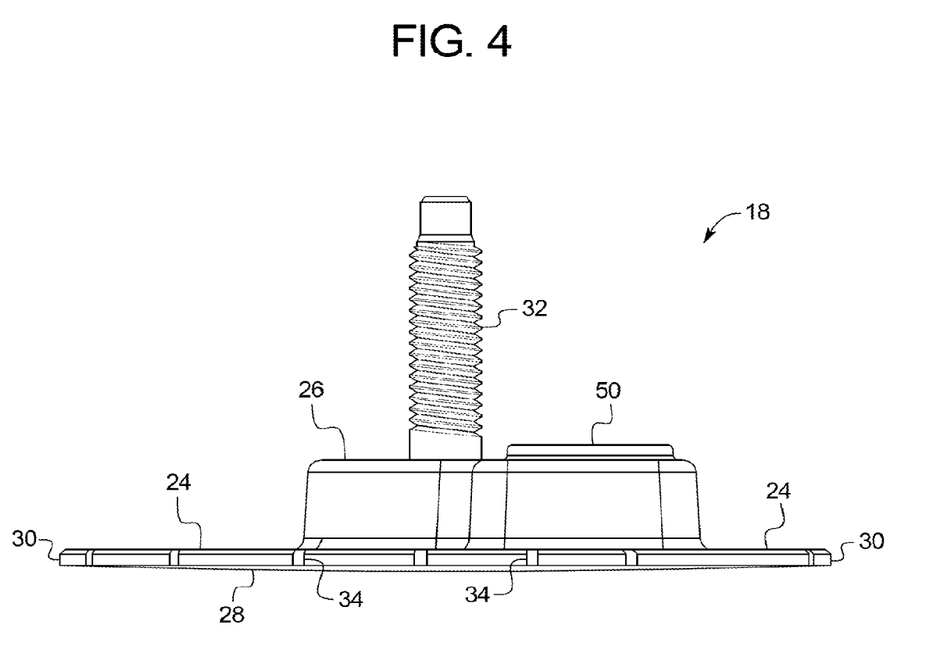
FIG. 4 is a side elevational view of the bracket.

Turning to FIGS. 2-4, the bracket 18 is shown in greater detail. The bracket 18 has a flange 24 extending around the periphery of the bracket 18 and a mounting boss 26 generally centered on the bracket 18. As shown in FIG. 3, the mounting boss 26 may not be perfectly circular or centered on the bracket 18. It may be preferred for the mounting boss 26 to be located within the perimeter of the flange 24, with the flange 24 extending around the circumference of the mounting boss 26. However, it is possible for the flange 24 to extend around only part of the circumference of the mounting boss 26 and for the mounting boss 26 itself to form part of the outer edge of the bracket 18. The flange 24 is a relatively thin portion that extends outward from the mounting boss 26. By contrast, the mounting boss 26 will generally be thicker than the flange 24 and extends upward from the flange 24. Preferably, the mounting boss 26 and the flange 24 are molded together as a single component and are made from the same plastic material, such as thermoplastic olefin. As shown in FIG. 4, the bottom surface 28 of the flange 24 is generally smooth so that it provides consistent contact with the interior surface 16 of the fascia 12. If desired, the portion below the mounting boss 26 may also be smooth and contiguous with the bottom surface 28 of the flange 24. However, the smooth bottom surface 28 need not be perfectly flat and may be shaped in a convex or concave shape if desired.

While numerous modifications to the bracket 18 may be made to suit particular needs, the size of the outer edge 30 of the flange 24 is preferably within 1 to 5 inches from the center of the bracket 18. The outer shape of the flange 24 may also be varied, but a circular outer edge 30 may be preferred. For example, a round flange 24 within 1 to 5 inches in size provides a reasonably small footprint for attaching the bracket 18 to a fascia 12 and allows the bracket 18 to be rotated as desired before welding. The thickness of the flange 24 is preferably about 1 to 3 mm to provide the desired flexibility while maintaining sufficient structural integrity.

A fastener 32 may also be provided on the mounting boss 26 for attaching various vehicle components to the mounting boss 26. Although various types of fasteners may be used, such as snaps, internal threads, etc., an externally threaded stud 32 as shown may be desirable. The stud 32 may be made of metal, in contrast to the plastic material of the flange 24 and mounting boss 26. In order to securely affix the stud 32 to the mounting boss 26, the head of the stud 32 may be molded and embedded into the plastic material of the mounting boss 26. As shown, it may be preferable for the stud 32 to extend perpendicularly upward from the mounting boss 26 and the flange 24. Thus, when the bracket 18 is attached to the interior surface 16 of a fascia 12 with the bottom surface 28 contacting the interior surface 16 of the fascia 12, the mounting boss 26 and stud 32 will extend inward from the interior surface 16 of the fascia 12.

As shown in FIG. 3, the flange 24 has a plurality of slots 34 extending through the thickness of the flange 24. The slots 34 extend inward from the outer edge 30 toward the mounting boss 26. The flange portions 36 that are located between adjacent slots 34 can be considered to be fingers 36 that flex around the interconnected portion 38 of each finger 36. Preferably, the inner end of each slot 34 is spaced apart from the mounting boss 26 so that there is a portion 40 of the flange 24 surrounding the mounting boss 26 that is unslotted 40. The inner ends of the slots 34 may also be provided with enlarged openings 42. This arrangement for the slots 34 is desirable to prevent tearing of the flange 24 from the inner ends of the slots 34 toward the center of the bracket 18. Also, the unslotted portion 40 of the flange 24 prevents stress concentrations near the mounting boss 26 due to flexing of the fingers 36. The width of the slots 34 is preferably about 0.5 to 3 mm. The length of the slots is preferably at least 5 mm, and more preferably at least 15 mm.

In use, the flange fingers 36 around the periphery of the bracket 18 flex up or down relative to the mounting boss 26 and relative to each other as needed to conform to the interior surface 16 of the fascia 12. Thus, the installer may push the bottom surface 28 of the bracket 18 against the interior surface 16 of the fascia 12, and the fingers 36 flex in response to the pressure in order to take the shape of the fascia 12. The width of the slots 34 also provides space between the fingers 36 to allow adjacent fingers 36 to move closer or farther away from each other as needed as the fingers 36 flex to conform to the fascia 12. Because the fingers 36 flex to varying degrees depending on the shape of the interior surface 16 of the fascia 12, the same bracket 18 may be used on many different fascias 12 and in different locations on a particular fascia 12. Thus, unlike conventional brackets that are molded with a particular curvature to match a single location on a specific fascia, the bracket 18 with flexible fingers 36 may be a universal bracket 18 that can be fitted to a variety of locations with different shapes, including on different fascias 12. Despite having a universal design, the bracket 18 can be welded to different locations without deforming the fascia 12 and causing noticeable blemishes to the exterior surface 14 of the fascia 12.

Figure 5:
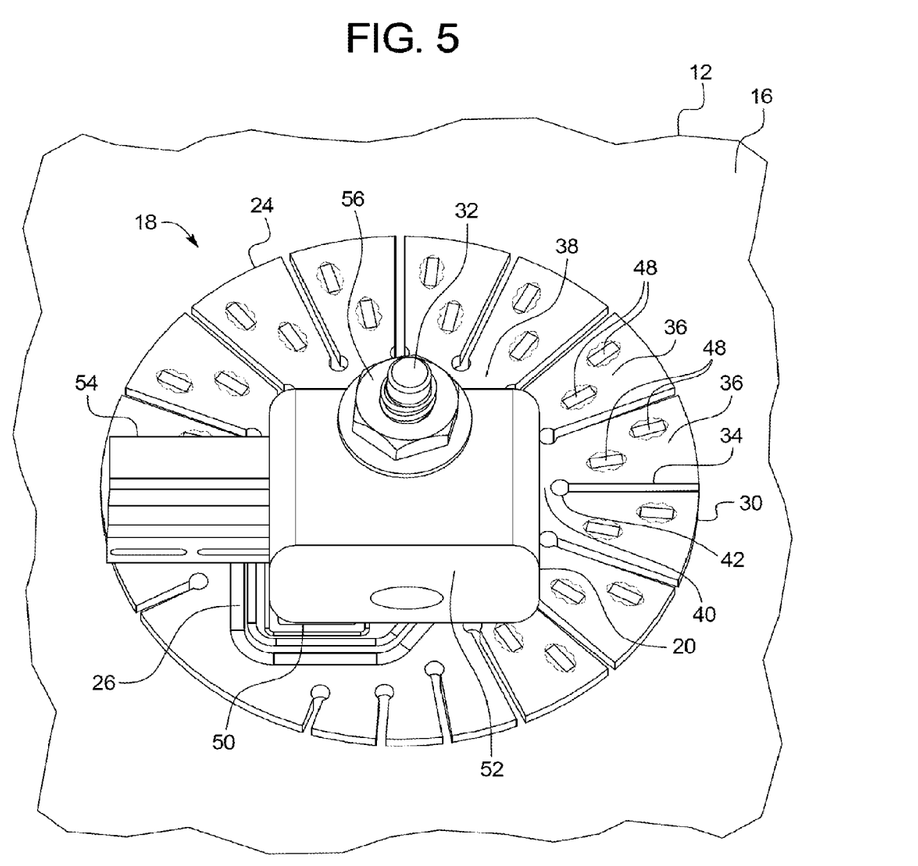
FIG. 5 is a top perspective view of the bracket, showing the bracket welded to a fascia and an impact sensor attached to the bracket.
Figure 6:
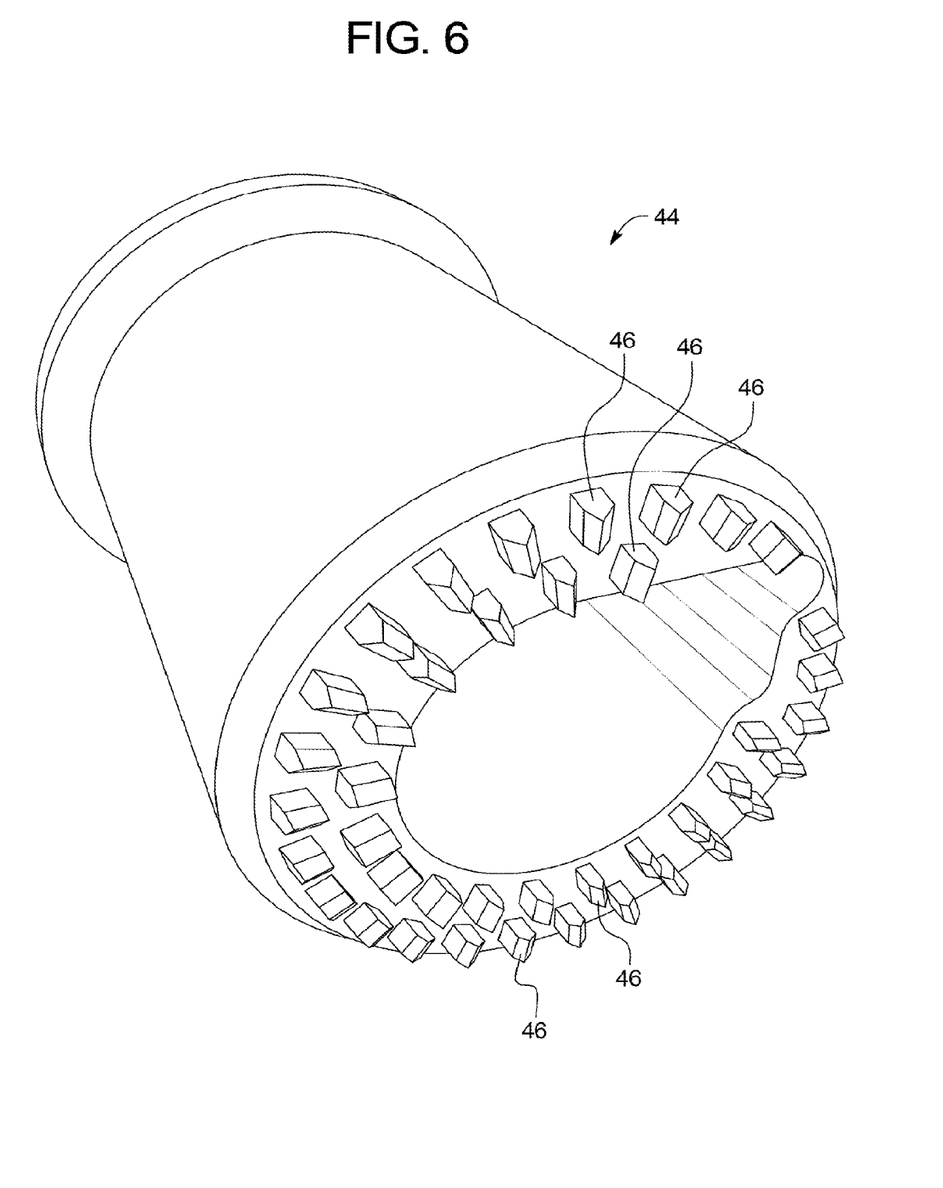
FIG. 6 is an end perspective view of a welding tool for welding the bracket to a fascia.

Once the bracket 18 is pressed against the interior surface 16 of the fascia 12, the fingers 36 may be welded to the fascia 12 to mount the bracket 18 to the fascia 12. An example of a tool 44 that may be used for welding the bracket 18 to the fascia 12 is shown in FIG. 6. The tool 44 is provided with a series of teeth 46 around the periphery. The teeth 46 are designed to press into the upper surface of the fingers 36. Preferably, the teeth 46 are ultrasonically vibrated through the flange 24 and into the fascia 12 in order to melt the fingers 36 and fascia 12 together. Thus, as shown in FIG. 5, the bracket 18 and fascia 12 are welded together by a series of weld points 48 formed by the teeth 46. As shown in FIG. 5, it may be desirable for the teeth/weld points 46, 48 to form at least two circumferential rows where the teeth/weld points 46, 48 in each row are offset from each other. With this arrangement, if the tool 44 and the bracket 18 are rotated such that one or more teeth 46 are positioned on a slot 34 (which would not result in the flange 24 being welded at that point), at least adjacent teeth 46 will penetrate the flange 24 to weld the bracket 18 and fascia 12 together. Although the universal bracket 18 need not be specially shaped for each location where the bracket 18 may be attached to a fascia 12, it may remain desirable for the welding tool 44 itself to be specially shaped to match the shape of the fascia 12 at each attachment location.

As also shown in FIG. 5, an impact sensor 20 may be attached to the mounting boss 26 after the bracket 18 is welded to the fascia 12. The impact sensor 20 may have a bottom protrusion (not visible) that is received by a recess 50 (shown in FIG. 3) to rotationally retain the sensor 20 to the bracket 18. The sensor 20 will typically have a sensor element 52 that includes an accelerometer or other sensing device for identifying low speed pedestrian impacts. An electrical connector 54 is also provided to connect the electrical wire(s) 22 to the control system. The sensor 20 may be attached to the mounting boss 26 of the bracket 18 with a hole that slides over the stud 32 of the bracket 18. A nut 56 may then be used to secure the sensor 20 to the bracket 18. It is understood, however, that other components could be attached to the bracket 18.

Figure 7:
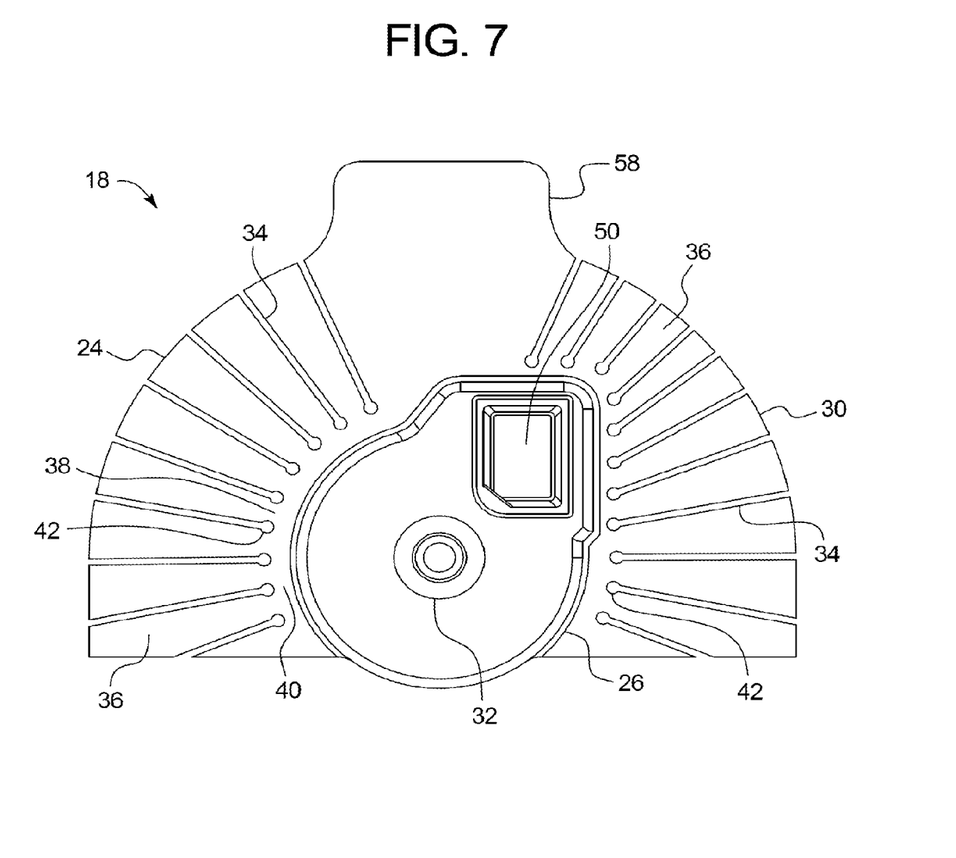
FIG. 7 is a top elevational view of another bracket.
Figure 8:
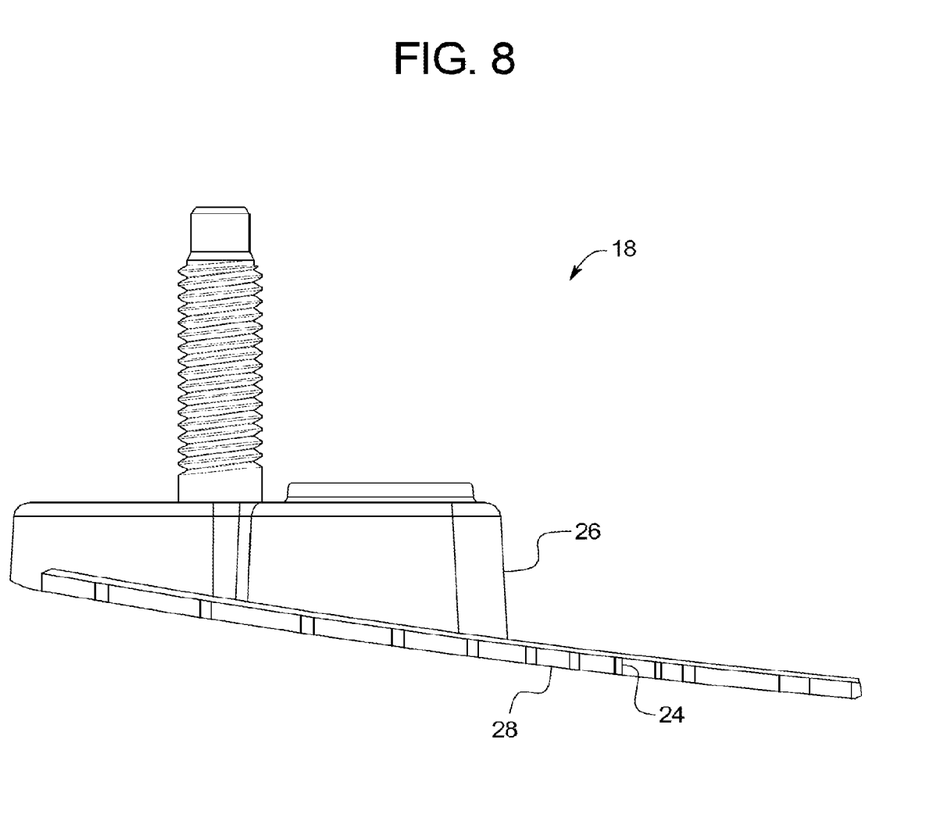
FIG. 8 is a side elevational view of the bracket.
Figure 9:
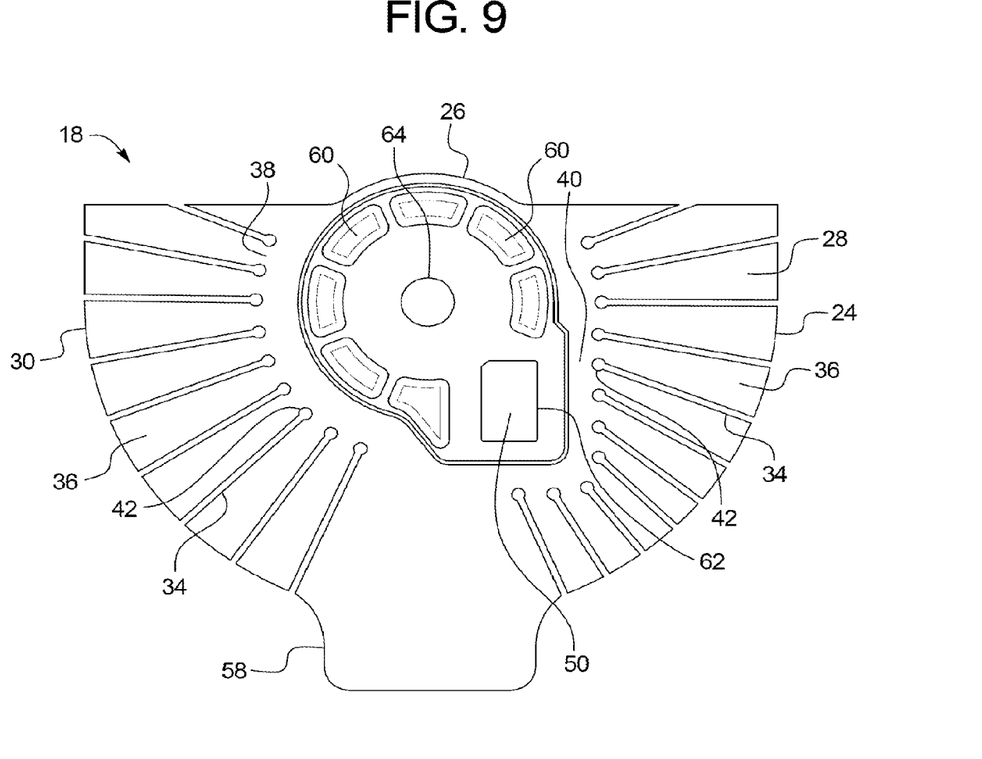
FIG. 9 is a bottom elevational view of the bracket.

Another bracket 18 is shown in FIGS. 7-9. The bracket 18 of FIGS. 7-9 is similar to the bracket 18 described above. Therefore, the complete description provided above need not be repeated for a proper understanding of the bracket 18 of FIGS. 7-9. As shown in FIG. 7, it is not necessary in all embodiments for the flange 24 to extend around the entire circumference of the mounting boss 26. Thus, the mounting boss 26 may form part of the outer edge of the bracket 18, and the flange 24 may extend around only part of the circumference of the bracket 18. However, it is preferable for the flange 24 to extend around at least 20% of the circumference of the mounting boss 26, and more preferably at least 50%.

As also shown in FIG. 7, part of the flange 24 may also be unslotted if desired. In this particular example, the unslotted portion is provided with a tab 58, which a barcode identification sticker may be placed upon. However, it is preferable for at least 50%, and more preferably at least 80%, of the flange 24 to be slotted.

As shown in FIG. 8, the bottom surface 28 of the flange 24 may be curved if desired to more closely match the curvature of the interior surface 16 of the fascia 12. This may allow the flexible fingers 36 to conform more easily to the shape of the fascia 12 than a flat flange 24.

As shown FIG. 9, the bottom portion of the boss 26 need not be contiguous with the bottom surface 28 of the flange 24 and may be recessed from the flange bottom surface 28. As illustrated, the bottom portion of the mounting boss 26 may be molded with recessed pockets 60 that extend up through the mounting boss 26 to reduce material costs and reduce sink marks in the molded bracket 18. As further illustrated in FIG. 9, the recess 50 for the impact sensor 20 may extend all the way through the mounting boss 26 to form a window 62 therethrough if desired. The head of the stud 32 may also be visible on the bottom portion of the mounting boss 26 through a window 64, which is typically formed in the molding process to ensure that the head of the stud 32 is lifted above the bottom of the mounting boss 26 and sufficiently embedded therein.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A bracket for mounting to an interior surface of a vehicle fascia, comprising:
   a flange made of plastic extending around at least a portion of a periphery of said bracket;
   a mounting boss disposed within said flange, said mounting boss extending upward from said flange and being thicker than said flange;
   a fastener disposed on said mounting boss for attaching a vehicle component to said mounting boss; and
   wherein said flange comprises a plurality of slots extending through said flange and extending from an outer edge of said flange toward said mounting boss, adjacent slots defining fingers therebetween, wherein said slots are defined by enlarged rounded openings at inner ends of said slots, said fingers being flexible to conform to said interior surface of said vehicle fascia, and said fingers being adapted to be welded to said interior surface when conformed thereto.

2. The bracket according to claim 1, further comprising an impact sensor disposed on said mounting boss and attached thereto with said fastener.

3. The bracket according to claim 1, wherein said mounting boss is molded to said flange and is made from the same plastic as said flange.

4. The bracket according to claim 1, wherein said flange is made from thermoplastic olefin.

5. The bracket according to claim 1, wherein a diameter of said enlarged rounded openings is substantially less than the length of the slots.

6. The bracket according to claim 1, wherein inner ends of said slots are spaced apart from said mounting boss, an unslotted portion of said flange thereby being disposed between said inner ends of said slots and said mounting boss.

7. The bracket according to claim 1, wherein said flange is 1 to 3 mm thick.

8. The bracket according to claim 1, wherein said fastener is a threaded stud extending perpendicular relative to said flange.

9. The bracket according to claim 1, wherein said outer edge of said flange is circular.

10. The bracket according to claim 1, wherein said outer edge of said flange is within 1 to 5 inches of a center of said bracket.

11. The bracket according to claim 1, wherein a bottom surface of said flange is smooth.

12. The bracket according to claim 1, wherein said mounting boss is molded to said flange, and said mounting boss and said flange are made from thermoplastic olefin.

13. The bracket according to claim 12, wherein said slots are defined by enlarged openings at inner ends of said slots, and said inner ends of said slots are spaced apart from said mounting boss, an unslotted portion of said flange thereby being disposed between said inner ends of said slots and said mounting boss.

14. The bracket according to claim 13, wherein said flange is 1 to 3 mm thick, and said outer edge of said flange is within 1 to 5 inches of a center of said bracket.

15. The bracket according to claim 14, wherein said outer edge of said flange is circular, and a bottom surface of said flange is smooth.

16. The bracket according to claim 15, further comprising an impact sensor disposed on said mounting boss and attached thereto with said fastener, and said fastener is a threaded stud extending perpendicular relative to said flange.

17. The bracket according to claim 1, further comprising a sensor disposed on said mounting boss and attached thereto with said fastener, said flange is made from thermoplastic olefin, a bottom surface of said flange is smooth, and inner ends of said slots are spaced apart from said mounting boss, an unslotted portion of said flange thereby being disposed between said inner ends of said slots and said mounting boss.

18. A vehicle fascia, comprising:
   an interior surface and an exterior surface, said exterior surface being an exposed aesthetic surface and said interior surface being an unexposed generally enclosed surface;
   a bracket mounted to said interior surface, said bracket comprising a flange made of plastic extending around at least a portion of a periphery of said bracket, a mounting boss disposed within said flange, said mounting boss extending upward from said flange and being thicker than said flange, and a fastener disposed on said mounting boss for attaching a vehicle component to said mounting boss; and
   wherein said flange comprises a plurality of slots extending through said flange and extending from an outer edge of said flange toward said mounting boss, adjacent slots defining fingers therebetween, wherein said slots are defined by enlarged rounded openings at inner ends of said slots, said fingers being flexible to conform to said interior surface of said vehicle fascia, and said fingers being welded to said interior surface when conformed thereto, said mounting boss thereby extending inward from said interior surface of said vehicle fascia.

19. The vehicle fascia according to claim 18, wherein said interior surface of said vehicle fascia, said flange and said mounting boss are made of thermoplastic olefin.

20. The vehicle fascia according to claim 19, further comprising an impact sensor disposed on said mounting boss and attached thereto with said fastener, said impact sensor being electrically connected to a control system for activating a pedestrian protection system in response to an impact against said vehicle fascia.

* * * * *